United States Patent [19]

Griffith et al.

[11] Patent Number: 5,117,548
[45] Date of Patent: Jun. 2, 1992

[54] APPARATUS FOR LOOSENING A MECHANICAL PLUG IN A HEAT EXCHANGER TUBE

[75] Inventors: John C. Griffith, Lynchburg; James E. Gutzwiller, Forest, both of Va.

[73] Assignee: The Babcock & Wilcox Company, New Orleans, La.

[21] Appl. No.: 703,082

[22] Filed: May 20, 1991

[51] Int. Cl.⁵ .............................................. B23P 19/02
[52] U.S. Cl. .................................. 29/426.4; 29/426.1; 29/890.031; 29/447
[58] Field of Search ............... 361/264, 266; 29/426.1, 29/426.4, 890.031, 447, 523; 138/97, 98

[56] References Cited

U.S. PATENT DOCUMENTS

| | | | |
|---|---|---|---|
| 3,900,939 | 8/1975 | Greacen | 29/402.09 |
| 4,573,248 | 3/1986 | Hackett | 29/423 |
| 4,829,660 | 5/1989 | Everett et al. | 29/426.4 |
| 4,903,392 | 2/1990 | Stickel et al. | 29/426.1 |
| 4,976,307 | 12/1990 | Hall et al. | 29/447 |
| 5,022,136 | 6/1991 | Tremmel | 29/426.5 |

Primary Examiner—P. W. Echols
Assistant Examiner—David P. Bryant
Attorney, Agent, or Firm—R. J. Edwards; D. Neil LaHaye

[57] ABSTRACT

An apparatus and method for loosening a mechanical plug in a tube. A cartridge having a nose portion, central portion formed from a material that produces an exothermic reaction when ignited, and a base is inserted into the plug to be loosened and removed. An insulated wire extends through the base into the central portion and is connected to a resistive noninsulated wire positioned in the central portion. Sending an electrical current through the wiring causes the noninsulated wire to heat up rapidly. The rapid heat buildup initiates an exothermic reaction in the central portion. The heat generated causes stress conditions in the plug that exceed plug yield and results in a stress relief condition in the plug where the diameter of the plug is reduced. This loosens the plug in the tube and reduces pulling forces needed to remove the plug from the tube.

14 Claims, 1 Drawing Sheet

APPARATUS FOR LOOSENING A MECHANICAL PLUG IN A HEAT EXCHANGER TUBE

BACKGROUND OF THE INVENTION

1. Field of the Invention

The invention is generally related to mechanical plugs and in particular to the removal of mechanical plugs from tubes.

2. General Background

In nuclear steam supply systems, heat exchangers are used to exchange heat between a primary and secondary coolant for converting the heat into useful energy. In tube-type heat exchangers a primary coolant fluid flows through the tubes of the heat exchanger while a secondary coolant fluid flows around the outside and in contact with the tubes such that heat exchange takes place between the two fluids. A defective or corroded tube presents the possibility of a leak wherein the higher pressure primary coolant will exit the tube and mix with the secondary coolant. This results in a loss of fluid from the primary system and in radioactive contamination of the secondary coolant in the nuclear steam generator. The most cost effective solution to such a problem is to plug the defective heat exchange tube. This minimizes down time of the heat exchanger. This minimizes down time of the system and allows repairs to be made during normal scheduled periods. The tubes are plugged by inserting a hollow plug and then expanding the plug interior diameter to cause its outer diameter to come into tight contact with the interior of the tube. Two types of plugs are in general use. Ribbed plugs have a series of ribs along the external diameter of the plug. The plug is caused to expand outwardly by an internally movable mandrel such that the plug ribs engage the tube. Rolled plugs receive an external tool that rolls along the inner diameter of the plug and causes the plug to expand outwardly into contact with the tube. The plugs may be removed when the system is removed from service in order to repair the defective tubes. Removal of these mechanically installed plugs has been accomplished using mechanical or thermal means. Mechanical means used may be machining or stretching and pulling. In the stretch and pull method a tool grips the head of the plug while a rod is inserted into the plug and pushes against the opposite end of the plug. Sufficient force is applied to elongate the plug. During elongation the plug contracts from the tube wall as a result of the Poisson effect. Pulling on the head of the plug while reacting against the tubesheet, removes the plug from the tube. A problem with this approach is that removal loads are generally high. This is due to the small amount of diameter reduction in the area of the roll. The process also has tended to be inconsistent. This is most likely due to work hardening in the roll area. Stretch and pull removal of rib plugs has also been used experimentally, but actual field use is not known. To reduce pull loads, a tungsten inert gas (TIG) torch process has been used. The torch is used to strike an arc on the inner diameter of the plug. The arc traverses the inner diameter of the expanded plug surface. The melting and subsequent solidifying of the plug inner diameter causes the plug to contract and pull away from the tube. Although this method is effective in reducing the pull loads compared to the stretch and pull method for rolled plugs, it is a complicated and slow process. There is less benefit when the method is used with ribbed plugs because the mandrel used to expand the ribbed plugs interferes with the ability of the torch to relax the entire area. The torch method first requires that the torch be calibrated. This step can take several hours. The plug is then blown dry. The torch is then installed onto a remotely operated tool. This requires care since the torch is cumbersome and has some parts such as a ceramic gas cup that are easily broken. The torch is set up under the plug by the use of the remotely operated tooling and leveled by the use of feedback from inclinometers. The gas cup is then inserted into the plug to a precisely predetermined distance. The process is initiated by striking the arc and simultaneously beginning rotation and axial travel of the torch inside the plug. The amperage of the torch must be controlled to prevent burning through the plug. The torch is withdrawn after the arc has traveled over the internal length of the rolled area of the plug. Upon completion, water usually drains from the tube being unplugged onto the torch and remotely operated tooling. It can be seen that the process and tooling using the torch is complex and time consuming. The water draining on the torch also results in the need for extra maintenance of the torch. Machining to remove plugs also requires that the tooling used for machining be precisely positioned. It can be seen that a need exists for a method of removing plugs that is simpler and faster than the torch and machining methods.

SUMMARY OF THE INVENTION

The present invention addresses the above problem in a straightforward manner. What is provided is an apparatus and method for loosening a mechanical plug using an exothermic reaction. A cartridge cast from materials to produce an exothermic reaction is inserted into the plug. A base at the end of the cartridge provides a loose seal to the head of the plug to prevent the ejection of molten metal from the interior of the plug while allowing the release of gas pressure. The material reaction is initiated electrically. The reaction generates heat in the plug that causes the plug to attempt to expand against a fixed object, the tubesheet. As the temperature of the plug increases, the constrained expansion builds up large stresses in the plug that exceed yield. At this point the inner diameter of the plug must contract to relieve the stresses. The plug may then be pulled at relatively low pulling forces by conventional pulling tools.

BRIEF DESCRIPTION OF THE DRAWINGS

For a further understanding of the nature and objects of the present invention, reference should be had to following description take in conjunction with the accompanying drawings in which like parts are given like reference numerals, and wherein.

DETAILED DESCRIPTION OF THE PREFERRED EMBODIMENT

Figure 1:
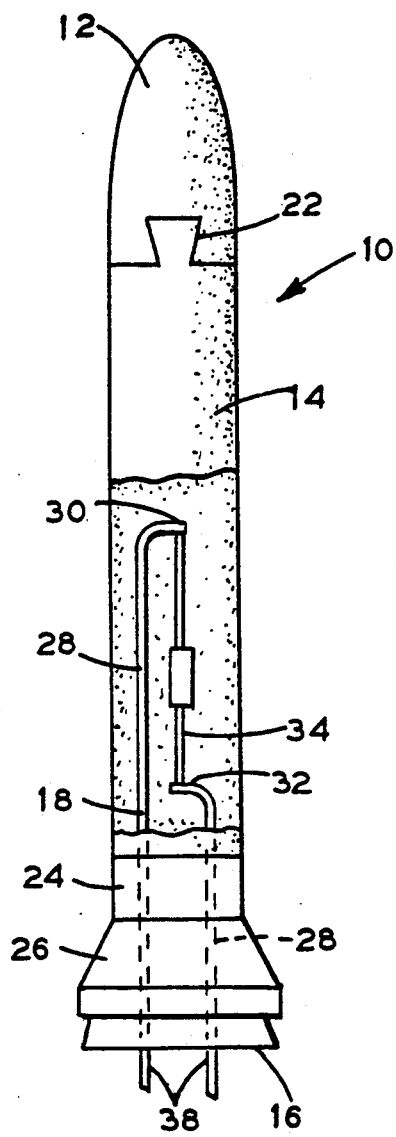
FIG. 1 is a side sectional view of the apparatus of the invention.

Referring to the drawings, it is seen in FIG. 1 that the invention is generally indicated by the numeral 10. Cartridge 10 is generally comprised of nose portion 12, central portion 14, base 16, and means 18 for initiating an exothermic reaction in central portion 14.

Nose portion 12 is formed by molding a mixture of sand and a commercially available binder into a tapered bullet shape. The binder maintains the molded shape.

The bullet shape eases insertion of cartridge 10 into plug 20. Nose portion 12 is provided with a tapered wedge insert 22 at its non-tapered end. Insert 22 provides an anchor point for the joint between nose portion 12 and central portion 14 during manufacture of cartridge 10.

Central portion 14 is formed from a material that produces an exothermic reaction when ignited. An example of a suitable material that produces such a reaction is Thermit ®, which is a powdered mixture of ferric oxide ($Fe_2O_3$) and aluminum. Examples of other suitable materials that produce the desired exothermic reaction when ignited include a powered mixture of manganese dioxide ($MNO_2$) and aluminum, a powered mixture of sodium chlorate ($NaClO_3$) and aluminum, and a powered mixture of sodium chlorate ($NaClO_3$) and calcium. In the preferred embodiment, central portion 14 is formed from a mixture of 25% fine grain Thermit ® and 75% coarse grain Thermit ® by weight.

A suitable binder such as sodium silcate solution is mixed with the powdered material and then molded into the shape of central portion 14. As seen in FIG. 1, central portion 14 is formed with nose portion 12 in place so that the material of central portion 14 fills wedge insert 22 in nose portion 12 and anchors the two pieces together.

Base 16 is formed in the same manner as nose portion 12 by molding a mixture of sand and a commercially available binder. First end 24 of base 16 is attached to central portion 14 and sized to have an outer diameter slightly smaller than the inner diameter of plug 20. This provides for ease of insertion and tolerance in variations of plug size. From first end 24, base 16 tapers outwardly away from central portion 14 to a larger diameter than plug 20. Tapered portion 26 forms an imperfect seal between base 16 and plug 20. This allows venting of gas pressure created during the heating of plug 20 by central portion 14 but prevents the discharge of any molten metal reaction products by allowing them to solidify in the heat sink of the annulus between base 16 and plug 20. During molding or casting of base 16, means 18 is positioned so as to protrude through base 16 into central portion 14 during the molding of central portion 14 and simultaneous attachment of base 16 thereto. Means 18 serves as an anchor point between central portion 14 and base 16.

Means 18 for initiating an exothermic reaction in central portion 14 is formed from insulated electrical wiring 28 that extends through base 16 and ends in leads 30,32. Attached between leads 30,32 is a relatively highly resistive noninsulated wire 34 that heats up rapidly when electrical current is passed through it in a similar manner to a light bulb filament. In the preferred embodiment wire 34 is a nichrome wire. The hot nichrome wire initiates the exothermic reaction in central portion 14. The length and position of Wire 34 can be used to help control the progress of the reaction. In the preferred embodiment, the length of wire 34 is substantially equal to the length of the rolled area 36 (seen in FIG. 2) of plug 20. This causes the reaction adjacent rolled area 36 to take place all at once and release the maximum amount of heat in the shortest period of time. Wiring 28 extends through base 16 and connects to exposed electrical contacts 38. Electrical equipment known in the industry is attached to base 16 and electrical contacts 38 to provide electrical current for initiating the exothermic reaction.

Figure 2:
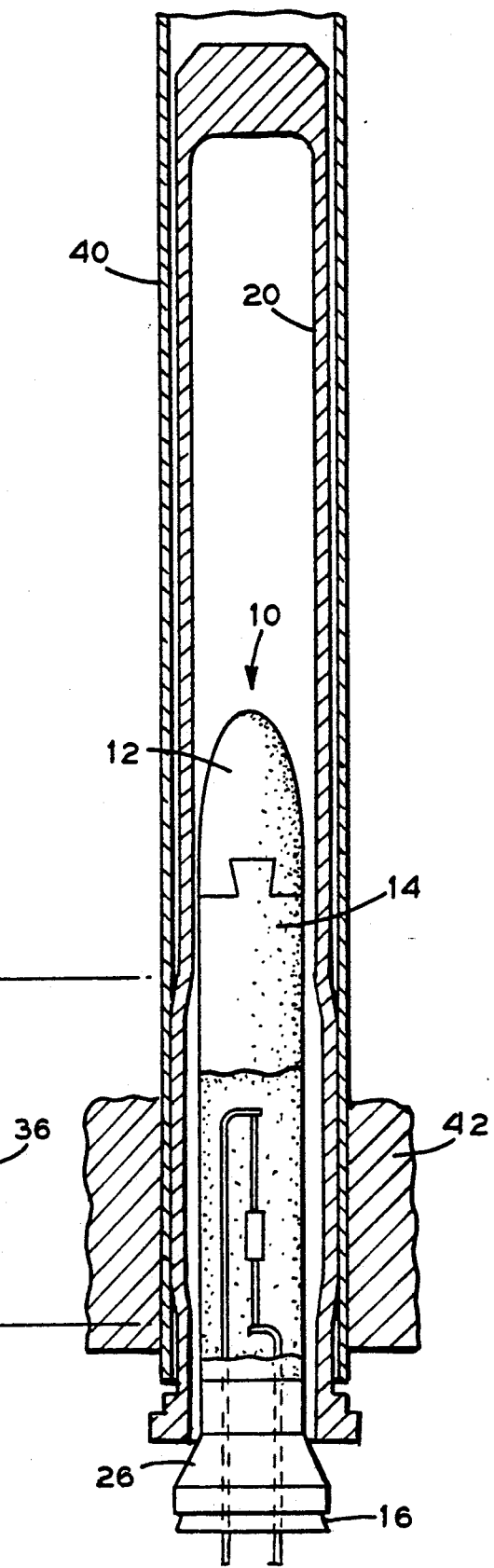
FIG. 2 is a side sectional view illustrating the apparatus of the invention installed in a plug to be removed.

In operation, cartridge 10 is inserted into plug 20 that is to be removed from tube 40. As seen in FIG. 2, plug 20 has been mechanically rolled at are 36 into a force fit with tube 40 adjacent tubesheet 42. Nose portion 12 is in a tapered bullet shape for ease of insertion. The outer diameter of nose portion 12, central portion 14, and first end 24 of base 16 are slightly smaller than the inner diameter of plug 20 for ease of insertion and to allow for tolerance differences in the size of plug 20. Tapered portion 26 of base 16 contacts and forms an imperfect seal with plug 20. Equipment not shown makes contact with base 16, plug 20, and electrical contacts 38. This equipment is then used to send an electrical current through electrical wiring 28 and noninsulated wire 34. The heat generated by noninsulated wire 34 initiates an exothermic reaction in central portion 14. This reaction quickly generates heat that can cause reduction of the plug diameter in at least two phases. In the first, the body of plug 20 is heated to a sufficiently high temperature where the inner diameter of plug 20 does not melt and the bulk of the plug body is well below the stress relief range for the plug material. This phase relieves the plug due to the heat causing the plug to attempt to expand against tubesheet 42, a fixed object. As the temperature of plug 20 increases, the constrained expansion builds up large stresses in plug 20 that exceed yield. The result is that the inner diameter of plug 20 must contract as the stresses exceed yield. This process is enhanced because the inner diameter of plug 20 is at a much higher temperature than the bulk of the plug and therefore has a lower yield strength than the rest of the plug body. The result is that a stress relief or creeping of the plug inner diameter takes place. A second phase is to take the plug body higher in temperature where the bulk of plug 20 reaches a stress relief condition. Since the reaction times are fairly short, on the order of fifteen seconds, the temperatures must be approximately 1500 degrees F. The combination of the two phases assures significant diameter reductions of plug 20. Plug pulling and removal equipment known in the industry may then be used to remove the plug with much greater ease. During the reaction, the imperfect seal between tapered portion 26 and plug 20 allows escape of hot gases while any molten metal by-products will solidify in the heat sink annulus between cartridge 10 and plug 20.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A cartridge for loosening a mechanical plug in a tube, comprising:
   a. a nose portion;
   b. a central portion formed from a material that produces an exothermic reaction when ignited and attached at a first end to said nose portion;
   c. a base attached to the second end of said central portion;
   d. means extending through said base into said central portion for initiating an exothermic reaction in said central portion; and
   e. a binder material included in said nose portion, central portion, and base whereby the shape of said cartridge is maintained without external support.

2. The cartridge of claim 1, wherein said base is provided with a section that tapers outwardly away from said central portion.

3. The cartridge of claim 1, wherein said means for initiating an exothermic reaction comprises insulated electrical wiring connected to a length of noninsulated wire positioned in said central portion.

4. The cartridge of claim 1, wherein said nose portion is tapered.

5. The cartridge of claim 1, wherein said central portion is formed from a powdered mixture of ferric oxide and aluminum.

6. The cartridge of claim 1, wherein said central portion is formed from a powdered mixture of manganese dioxide and aluminum.

7. The cartridge of claim 1, wherein said central portion is formed from a powdered mixture of sodium chlorate and aluminum.

8. The cartridge of claim 1, wherein said central portion is formed from a powdered mixture of sodium chlorate and calcium.

9. A cartridge for loosening a mechanical plug in a tube, comprising:
 a. a nose portion;
 b. a central portion formed from a material that produces an exothermic reaction when ignited and attached at a first end to said nose portion;
 c. a base attached to the second end of said central portion and having a section that tapers outwardly away from said central portion;
 d. means extending through said base into said central portion for initiating an exothermic reaction in said central portion comprising insulated electrical wiring connected to a length of noninsulated wire positioned in said central portion; and
 e. a binder material included in said nose portion, central portion, and base whereby the shape of said cartridge is maintained without external support.

10. The cartridge of claim 9, wherein said nose portion is tapered.

11. The cartridge of claim 9,. wherein said central portion is formed from a powdered mixture of ferric oxide and aluminum.

12. The cartridge of claim 9, wherein said central portion is formed from a powdered mixture of manganese dioxide and aluminum.

13. The cartridge of claim 9, wherein said central portion is formed from a powdered mixture of sodium chlorate and aluminum.

14. The cartridge of claim 9, wherein said central portion is formed from a powdered mixture of sodium chlorate and calcium.

* * * * *